Figure 1:
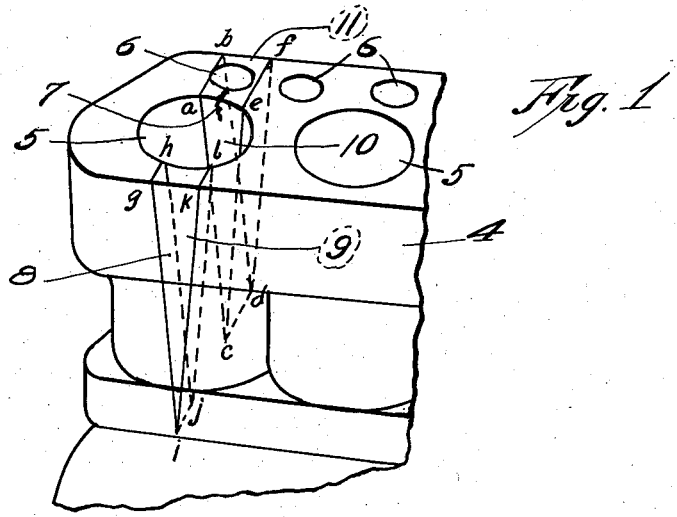

Oct. 7, 1930.                R. PETERSON                 1,777,531
                            WELDING PROCESS
                          Filed Aug. 26, 1927

INVENTOR.
Roy Peterson
BY
Roy E. Hamilton
ATTORNEY.

Patented Oct. 7, 1930

1,777,531

UNITED STATES PATENT OFFICE

ROY PETERSON, OF SHEYENNE, NORTH DAKOTA

WELDING PROCESS

Application filed August 26, 1927. Serial No. 215,590.

This invention relates to the process of welding or brazing large unwieldy shapes of cast iron, such as engine blocks, engine heads, etc., and is adapted to welding the same without preheating the entire casting as is done at the present time.

In the method now used in welding engine blocks, the block is removed from the chassis, and all parts which might be injured if subjected to the heat to which the block must be subjected, are removed. After the block is thus prepared, the same is entirely preheated in order to obtain a like expansion of all parts in order to prevent undue strain on any particular portion or portions, of the block which might occur should the block be unevenly heated. This method is very expensive and requires a great deal of time.

The process of welding as set forth in the present invention, has for its object the welding, or brazing, of cast iron engine blocks, or similar castings, by so applying heat to a portion of the engine block, said portion including the part to be welded and extending therebeyond, as to cause a varying expansion of the block in such a way as to prevent undue pressure in any part of the block which might cause a crushing of the metal, and likewise, after the welding heat is reached, and the block is permitted to cool, the contraction will be uniformly distributed along the entire length of the heated portion, thereby permitting the casting to return to its original state without fracture.

Since the greatest heat necessary in this operation is the welding heat, which is applied at the place of welding, while the portion extending therebeyond is graduated from said welding heat to the normal temperature of said block, it is apparent that the maximum amount of expansion will be at the place of welding, and will likewise decrease gradually as it recedes therefrom, in substantially direct proportion to the amount of heat applied. It is necessary in this method of heating the block, that all portions of the block which might be subjected to undue strain must be properly heated, in order that the expansion may be properly distributed over a sufficiently large portion of the block to prevent a crushing of the metal.

In order to distribute the expansion and contraction as described above, it is necessary that the block be gradually expanded from a line extending thru said block to the welding zone where the heat is at its maximum, thus causing the block to gradually expand from said line to the zone of welding. The direction of said line thru the block is not material, but it is only necessary that the heat should vary uniformly to all parts of said block between said line and the line of the welding zone.

In order to more clearly set forth the process used in this invention, reference is now made to the accompanying drawing, which graphically shows a few of the applications of this welding process to a fractured engine block.

Figure 1, is a representation of an engine block partly broken away, and with the head removed. The numeral 4 designates an engine block having a series of cylinders 5, and the usual exhaust and intake ports 6. A fracture 7, which extends from the cylinder 5 to one of the ports 6, which is one of the most common fractures in practice, extends from the top of the engine block to a depth of an inch or two. In order to weld this fracture by the process as set forth in this invention, it is necessary to move the piston to its lowest position in the cylinder in which the welding is to be done.

The flame of any suitable torch, such as oxy-acetylene, is then applied to the triangular surfaces 8, 9, 10 and 11, in such a manner as to heat similar portions of the wedges $a\ b\ c\ d\ e\ f$ and $g\ h\ i\ j\ k\ l$, uniformly. The butts of said wedges being heated to the maximum heat to be used and the temperature gradually decreasing as the wedge narrows. This heating of the wedge may be accomplished by passing the flame down the center line of said triangular surfaces at a substantially uniformly varying rate of speed, slowed at the wide portion, and faster as the point is approached.

The heating of these wedge portions of the block is accomplished by several applications of the flame, since it is necessary to maintain a minimum differential of temperature of the heated ports at all times during the process.

The result on the block due to this heating will be to expand the outer portion of the block to a maximum and then gradually decrease the expansion of the block from this maximum expansion to a minimum expansion, thus causing no excess pressure on any part of the block.

When the proper welding heat is attained, the flux is applied, and the weld made, the heat again applied until the heated portions are again heated to similar temperatures as were attained just prior to the welding. The block is then permitted to gradually cool, and the contraction will be gradual and uniform, thus preventing undue strains which might fracture the block.

If it is deemed advisable, the application of asbestos paper or the like, may be applied to obtain uniform cooling of the parts.

In some of the welding operations, where the weld is extensive, it may be only a portion of the weld can be made at a time, then it would be necessary to repeat the heating between each partial weld until the complete weld is made.

Figure 2:
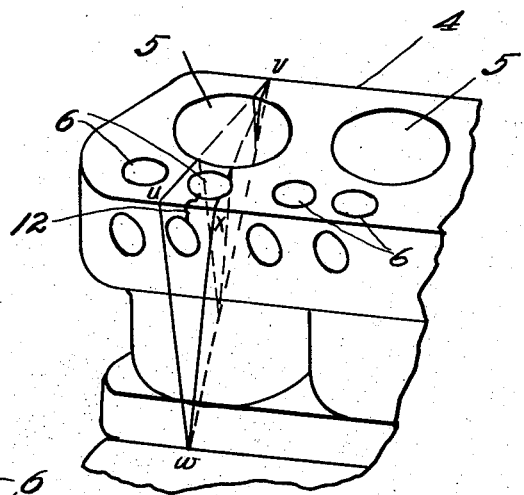

Fig. 2 shows another condition which might arise, when a similar engine block is fractured on its outside wall adjacent one of the ports. In this case, it is not necessary to heat the opposite side of the engine block as in the example shown in Fig. 1. Yet, the principles of expansion and contraction are similar, and the block may be successfully welded in the same manner, as described above. In this figure, the fracture is designated by the numeral 12, and the portion to be heated by the letters $u\ v\ w\ x$.

Figure 3:
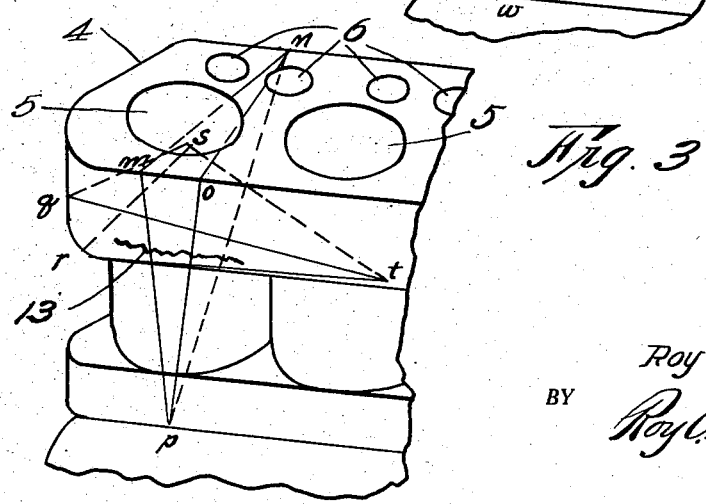

Fig. 3 illustrates another type of fracture in which it is necessary to expand the block in more than one direction. This occurs where the fracture is in the side of the block, as shown at 13, and especially where a long welding heat is required. The process is similar to the ones described above, but the heated portions extend in two general directions, as indicated by the wedge shaped portions $m\ n\ o\ p$ and $q\ r\ s\ t$. While this is the preferable way of heating for this type of weld, yet the weld could be very successfully made by this process by continuing the heated wedge $m\ n\ o\ p$ far enough into the block to take care of the expansion without heating the wedge portion $q\ r\ s\ t$.

I do not limit this invention to the examples shown and described, as many modifications within the scope of the appended claims may be made without departing from the spirit thereof.

Having thus described this invention, what is claimed as new and desired to be secured by Letters Patent is:

1. The process of welding engine blocks and the like, which consists in gradually heating a plurality of intersecting portions of said engine block, said portions extending from the outer surface of said block, intersecting at the part to be welded and extending therebeyond, the outer end of said heated portions including the part to be welded being heated to a welding heat while the portion extending therebeyond is graduated from said welding heat to substantially the normal temperature of said block, then welding the block, after which, the intersecting portions of the block being again heated to the pre-welding heat and then permitted to gradually cool by the successive application of a less amount of heat.

2. The process of welding engine blocks and the like, which consists in gradually heating a plurality of intersecting portions of said engine block, said portions extending from the outer portions of said block and intersecting at the part to be welded, the intersecting portions including the part to be welded being heated to a welding heat while the portion extending therebeyond is gradually heated from said welding heat to substantially the normal temperature of said block, then welding the block, after which the intersecting portions are heated to maintain a graduated temperature of said portions until the block is cooled.

In testimony whereof, I hereunto affix my signature.

ROY PETERSON.